United States Patent [19]

Neki et al.

[11] Patent Number: 4,676,180
[45] Date of Patent: Jun. 30, 1987

[54] SEWING MACHINE WITH REFERENCE SPEED CORRECTION BY DIMENSIONAL RATIO BETWEEN MOTOR- AND ARMSHAFT-PULLEYS

[75] Inventors: Shigeo Neki; Kenichi Ohara; Nobuho Shibata; Takashi Dohi, all of Osaka, Japan

[73] Assignee: Matsushita Electric Industrial Co., Ltd., Japan

[21] Appl. No.: 861,720

[22] Filed: May 12, 1986

[30] Foreign Application Priority Data

May 13, 1985 [JP] Japan .................. 60-100707
May 13, 1985 [JP] Japan .................. 60-100708
May 13, 1985 [JP] Japan .................. 60-100709
May 13, 1985 [JP] Japan .................. 60-100710
May 13, 1985 [JP] Japan .................. 60-100711

[51] Int. Cl.⁴ ............................... D05B 69/18
[52] U.S. Cl. ...................................... 112/277
[58] Field of Search ........... 112/277, 275, 220, 121.11, 112/67, 87; 318/310, 311, 312, 313, 314, 326, 327

[56] References Cited

U.S. PATENT DOCUMENTS 4,080,914  3/1978  Ishida et al. ................. 112/277
4,473,020  9/1984  Neki et al. ................... 112/277
4,516,514  5/1985  Neki et al. ................... 112/275

Primary Examiner—Peter Nerbun
Attorney, Agent, or Firm—Lowe, Price, LeBlanc, Becker & Shur

[57] ABSTRACT

A sewing machine comprises a multiplier for multiplying an operator-controlled variable reference speed value by a multiplying factor, a tachogenerator for generating speed-related pulses at a rate proportional to the speed of rotation of a motor pulley and an angular position detector for generating a position pulse in response to a predetermined position of an armshaft pulley which is coupled by a belt to the motor pulley. A ratio detector is provided for counting the speed-related pulses present during the interval between successive ones of the position pulse to generate a count as a representation of the diameter of the armshaft pulley and deriving a ratio value between the count and a value representative of the diameter of the motor pulley. The ratio value is applied to the multiplier as the multiplying factor to alter the reference speed value. A speed control circuit is responsive to the speed-related pulses for deriving an actual motor speed value and controls the speed of the motor in accordance with a difference between the actual motor speed value and the altered reference speed value.

5 Claims, 10 Drawing Figures

SEWING MACHINE WITH REFERENCE SPEED CORRECTION BY DIMENSIONAL RATIO BETWEEN MOTOR- AND ARMSHAFT-PULLEYS

BACKGROUND OF THE INVENTION

The present invention relates to a sewing machine having a motor and an armshaft which are coupled together by means of a pulley-and-belt arrangement.

Conventional industrial sewing machines comprise a foot pedal, a speed setting device responsive to the amount of depression of the pedal to establish a reference speed, and an armshaft with a needle driven by a motor. A pulley-and-belt arrangement is employed to couple the motor to the armshaft to cause reciprocation of the needle. A speed control circuit detects the difference between the actual speed of the motor sensed by a tachogenerator and the reference speed and controls the motor so that the difference reduces to zero. The speed of rotation of the armshaft depends on the ratio between the diameter of the motor pulley and the diameter of the armshaft pulley. For this reason, it has been necessary to calibrate the armshaft speed by measuring the diameter of the armshaft pulley and selecting a motor pulley corresponding to the measured diameter. However, armshaft pulleys vary in size between different sewing machines. The calibration is thus required for each sewing machine, which is tedious and time consuming for mass production of industrial sewing machines.

SUMMARY OF THE INVENTION

It is therefore an object of the present invention to provide a sewing machine which automatically detects the ratio between the diameters of motor- and armshaft-pulleys and alters the reference sewing machine speed with the detected ratio.

Specifically, a sewing machine of the present invention comprises a multiplier for multiplying an operator-controlled variable reference speed value by a multiplying factor, a tachogenerator for generating speed-related pulses at a rate proportional to the speed of rotation of a motor pulley driven by a motor and an angular position detector for generating a position pulse in response to a predetermined position of an armshaft pulley which is coupled by a belt to the motor pulley. A ratio detector is provided for counting the speed-related pulses present during the interval between successive ones of the position pulse to generate a count as a representation of a dimension of the armshaft pulley and deriving a ratio value between the count and a value representative of a dimension of the motor pulley. The ratio value is applied to the multiplier as the multiplying factor to alter the reference speed value. A speed control circuit is responsive to the speed-related pulses for deriving an actual motor speed value and controls the speed of the motor in accordance with a difference between the actual motor speed value and the altered reference speed value.

BRIEF DESCRIPTION OF THE DRAWINGS

The present invention will be described in further detail with reference to the accompanying drawings, in which.

DETAILED DESCRIPTION

Figure 1:
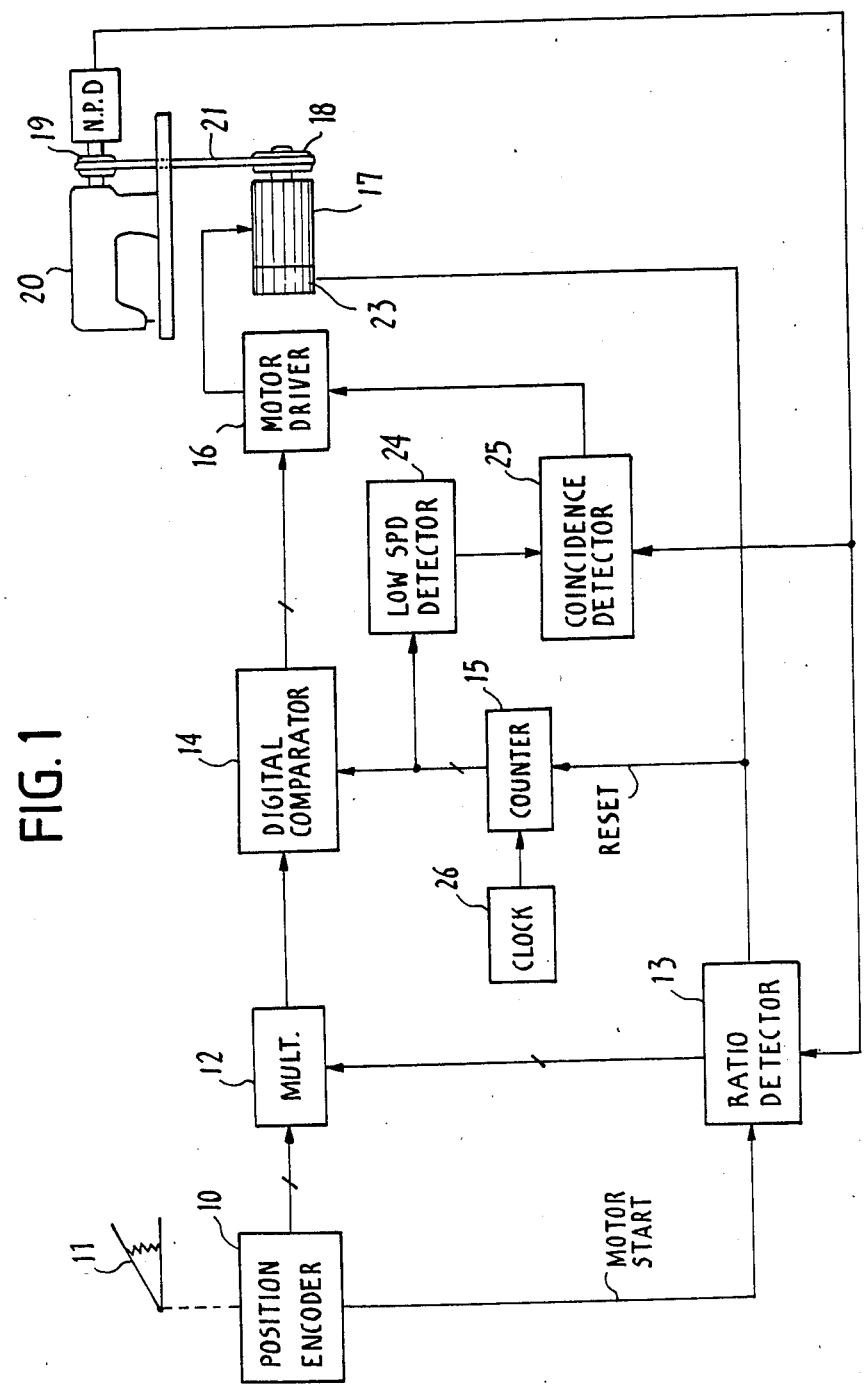
FIG. 1 is a block diagram of a sewing machine according to the present invention.

Referring now to FIG. 1, there is shown a sewing machine according to a preferred embodiment of the present invention. The sewing machine comprises an armshaft 20 driven by an armshaft pulley 19, an AC motor 17 for driving a motor pulley 18 coupled to the armshaft pulley 19 by a belt 21. A needle position detector 22 is coupled to the armshaft pulley 19 to generate a needle position pulse when the needle is at an upward position. A tachogenerator 23 is coupled to the motor to supply speed-related pulses to a period counter 15 and a ratio detector 13. Period counter 15 counts clock pulses supplied from clock 26 in response to reset pulses from tachogenerator 23 and generates a binary count representing the number of clock pulses present during the interval between successive reset pulses. The output of counter 15 is applied to a digital comparator 14 as an indication of the actual speed of motor 17. A speed setting device comprises a foot pedal 11 and a position encoder 10 which is coupled to the pivot of the pedal to generate a digital speed setting signal in accordance with the amount of depression of foot pedal 11, the speed setting signal being applied to a digital multiplier 12 where it is combined with a correcting factor supplied from a ratio detector 13 whose function will be described later. The output of multiplier 12 is supplied to the digital comparator 14 for comparison with the output of period counter 15. Digital comparator 14 generates an output indicating the magnitude and direction of deviation of the actual motor speed with respect to the reference speed, the comparator output being fed to a motor driver 16 where it is converted to an analog motor control signal and fed to the motor 17. The speed of motor 17 is thus controlled in a closed loop to the reference speed established by the foot pedal 11.

A low-speed detector 24 is connected to the output of counter 15 to detect when the actual motor speed is lower than a value appropriate for thread cutting operation. The output of low-speed detector 24 is applied to a coincidence detector 25 to which the needle position pulse is also applied. Coincidence detector 25 develops an output when the needle-up position is detected at low sewing speeds, the coincidence output being applied to motor driver 16 to decelerate the motor.

As will be described later, ratio detector 13 counts tachogenerator output pulses that occur during the interval between successive needle position signals as a representation of the diameter of armshaft pulley 19 and divides the count by a factor which is proportional to the diameter of motor pulley 18 and is represented by the number of pulses generated during a full revolution of motor 17. The output of ratio detector 13 represents the ratio of the diameter of armshaft pulley to the diameter of motor pulley and is applied to multiplier 12 to correct the reference speed with the pulley diameter ratio. Thus, sewing machine speed is automatically controlled to desired speed by compensating for differences in size between different armshaft pulleys.

Figure 2:
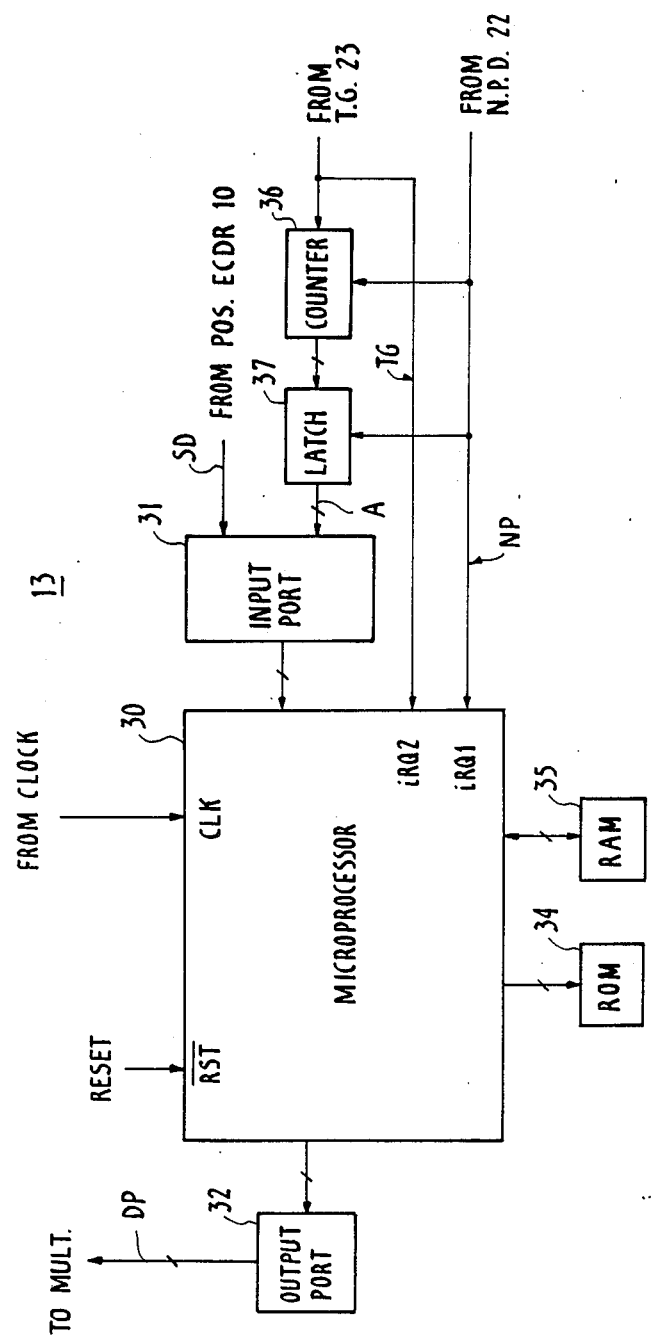
FIG. 2 is a block diagram illustrating the detail of the ratio detector of FIG. 1.

As shown in FIG. 2, ratio detector 13 comprises a microprocessor 30, a counter 36 and a latch 37. Counter 33 is connected to the output of tachogenerator 23 to initiate counting tachogenerator output pulses in response to a needle position signal from detector 22. A binary output of counter 36 indicates the number of speed related pulses generated during the interval of a full revolution of the armshaft pulley 19, the counter output being transferred to latch 37 in response to the needle position signal. The count value stored in latch 37 is applied through an input port 31 to microprocessor 30. The outputs of needle position detector 22 and tachogenerator 23 are applied to interrupt terminals iRQ1 and iRQ2 of the microprocessor, respectively, to cause it to execute interrupt routines. A read-only memory 34 stores a dividing factor, i.e., the number of pulses generated by tachogenerator 23 during full revolution of the motor shaft pulley and an initial value ratio $DP_1$.

Figure 3A:
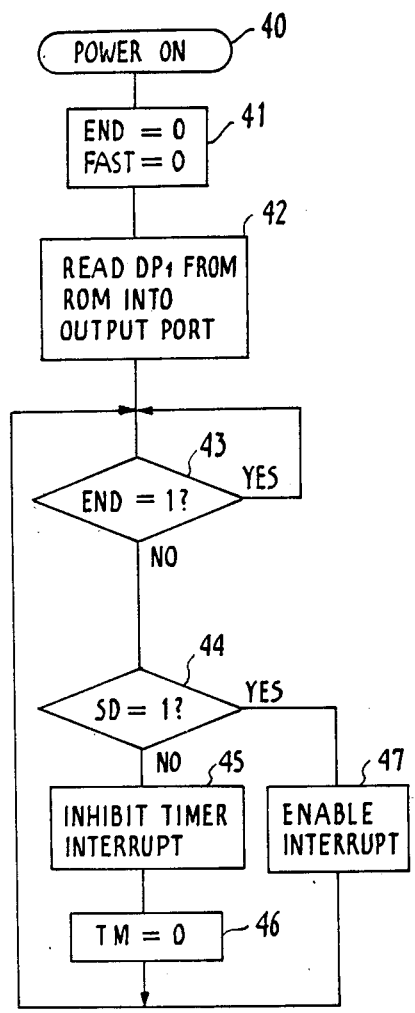
FIGS. 3A and 3B are flowcharts of instructions performed by the microprocessor of FIG. 2, describing respectively a power-on interrupt routine for deriving an initial ratio value and a needle position interrupt routine for deriving a pulley diameter ratio.
Figure 3B:
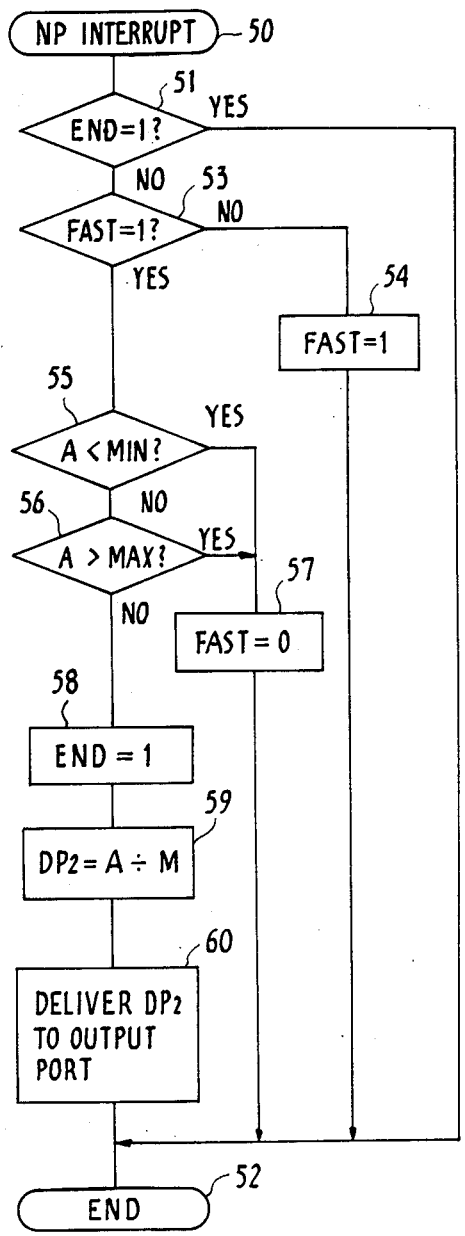
Figure 4:
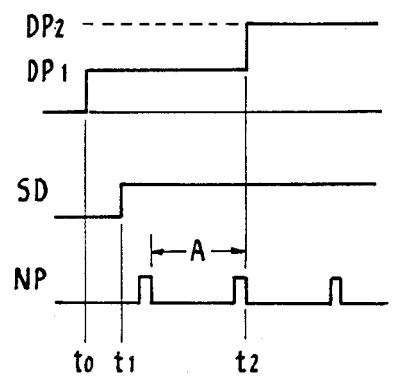
FIG. 4 is a timing diagram associated with the flowcharts of FIGS. 3A and 3B.

FIGS. 3A and 3B are illustrations of a program describing the instructions stored in ROM 34 according to an embodiment of the invention. In FIG. 3A, block 40 turns on the sewing machine in response to the pressing of an "ON" button at time $t_0$ (see FIG. 4). This calls for the step of initialization block 41, which resets "END" and "FAST" flags to zero. The next step in the program is indicated by block 42 which directs the reading of an initial value of ratio $DP_1$ from RAM 35 into the output port 32. Control exits to block 43 to check to see if the END flag has been set to "1". If the answer is affirmative, decision block 43 is repeated, and if the answer is negative, exit is to decision block 44 which tests for the presence of a motor start signal SD. This start signal is generated at time $t_1$ by the speed setting device 10 when foot pedal 11 is depressed to a predetermined forward position. Therefore, if the start signal SD is not present after the sewing machine has been turned on, the decision at block 44 causes control to exit to operations block 45 which directs the disabling of timer interrupt. Following the execution of block 45, block 46 directs the resetting of the timer TM to zero. After execution of block 46, control jumps to block 43 to repeat the process. If the start signal is present, the exit from decision block 44 is to operations block 47 which directs the enablement of interrupt routines.

With the initial value being loaded into the output port 32, the foot pedal 11 is returned to a speed indicating position which is translated by speed setting device 10 into a digital value and fed to multiplier 12 where it is modulated with the initial value $DP_1$. Since tachogenerator 23 generates no output pulses at this moment, the output of counter 15 assumes a large value. As a result, the comparison at digital comparator 14 results in an output signal which gives a sufficient amount of torque for starting the motor 17. With the motor 17 being started, needle position detector 22 starts generating a needle position pulse Np which is applied to the interrupt command terminal iRQ1.

As illustrated in FIG. 3B, a needle position interrupt starts with block 50 which calls for block 51 which tests for the presence of an END=1 flag indicating the end of the needle position interrupt routine. If there is one, control returns to end-of-interrupt block 52. If there is none, the exit is to decision block 53 which tests for the presence of a FAST=1 flag indicating the generation of the first needle position pulse NP. Therefore, during the initial period of sewing operation, the microprocessor responds to a needle position pulse NP of the first occurrence by causing the program to exit from decision block 53 to operations block 54 which directs the setting of the FAST flag to "1" and to return to block 52. Thus, the generation of a needle position pulse NP of the second occurrence at time $t_2$ causes control to exit from decision block 53 to decision block 55.

The generation of two successive needle position pulses NP indicates that the armshaft pulley has completed a full revolution. Meanwhile, counter 36 counts speed-related pulses from tachogenerator 23 that occur during the interval between the two successive needle position pulses NP just mentioned to produce a count "A" representing the diameter of the armshaft pulley, the count "A" being stored in latch 37 and read out through input port 31 into the microprocessor for comparison with a minimum allowable value MIN. Decision block 55 provides this comparison. If the armshaft count is smaller than the minimum value, it is dismissed as invalid and control exits to operations block 57 which directs the resetting of the FAST flag to zero to repeat the needle position interrupt routine. If the armshaft count is greater than the minimum value, the exit is to decision block 56 which tests for the presence of an armshaft count greater than a maximum allowable value MAX. If the count exceeds MAX the exit is to block 57 to reset the FAST flag, and if the count does not exceed MAX the armshaft count is acceptable and control exits to operations block 58 which directs the setting of END flag to "1" indicating that a needle position interrupt routine has been accomplished. Control now exits to operations block 59 which directs the arithmetic division of the armshaft count value "A" by a constant "M" representing the number of speed-related pulses generated by tachogenerator 23 during a full rotation of the motor pulley to derive a ratio $DP_2$ of the armshaft pulley diameter to the motor pulley diameter. The exit then is to operations block 60 which delivers the ratio $DP_2$ to output port 32 to update the initial ratio $DP_1$.

During subsequent sewing operations, the pulley diameter ratio $DP_2$ is used by multiplier 12 as a multiplying factor. As a result, differences in armshaft pulley diameter between different sewing machines are automatically compensated for by the multiplier 12. Thus, for a given amount of foot pedal depression, the speed of different sewing machines can be made to correspond to the desired setting regardless of the different sizes of the individual armshaft pulleys.

Figure 5A:
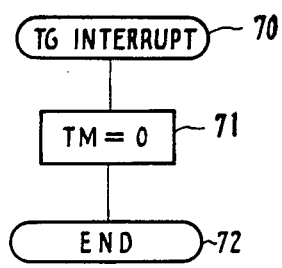
FIGS. 5A and 5B are flowcharts describing tachogenerator interrupt and timer interrupt routines for deriving an incremental initial ratio.
Figure 5B:
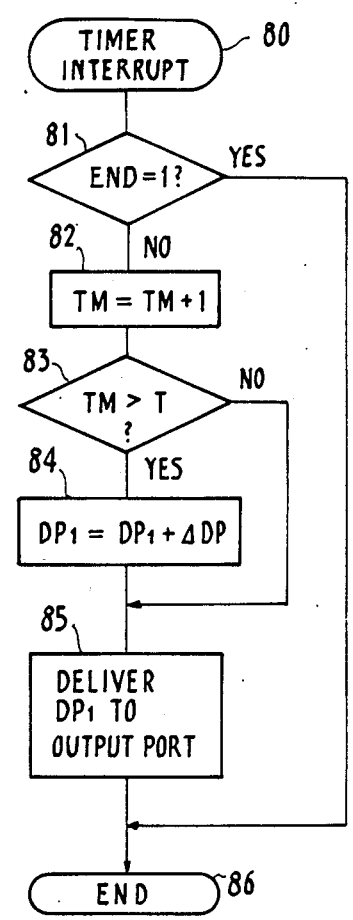
Figure 6:
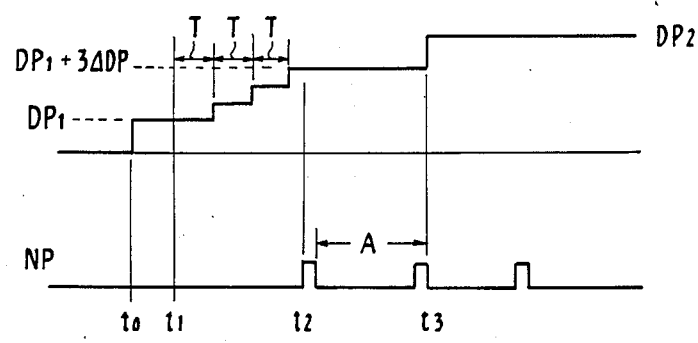
FIG. 6 is a timing diagram associated with FIGS. 5A and 5B.

An appropriate value for the initial ratio $DP_1$ is in the range between ⅛ and ¼. However, if the initial ratio $DP_1$ is too small for a sewing machine due to the unknown pulley diameter ratio, it takes longer for the motor to reach desired speed. This can be overcome by periodically incrementing the initial ratio $DP_1$. FIGS. 5A and 5B are flowcharts for incremental setting of the initial ratio $DP_1$. In FIG. 5A, block 70 initiates a tachogenerator interrupt routine in response to the receipt of an output pulse from tachogenerator 23 at interrupt terminal iRQ2. This tachogenerator interrupt calls for block 71 which directs the resetting of a timer TM and block 72 which terminates the tachogenerator interrupt. In FIG. 5B, block 80 initiates a timer interrupt routine which calls for decision block 81 which tests for the presence of an END=1 flag indicating the end of the needle position interrupt routine mentioned previously. If the end flag is one, control exits to block 86 to terminate the timer interrupt routine; if the end flag is not one, the exit is to operations block 82 which causes the timer to increment by one. Exit then is to decision block 83 which checks to see if the timer count value TM exceeds a predetermined value T. If the answer is negative, the exit is to operations block 85 and if it is affirmative, control proceeds to operations block 84 which directs the addition of an incremental value $\Delta DP$ to the initial value $DP_1$ which was obtained at time $t_0$ (see FIG. 6) by the power-on routine 40 (FIG. 3A). Exit then is to operations block 85 which delivers the incremented initial ratio $DP_1$ to the output port 32. The above process will be repeated if the motor speed is very low, and the initial value $DP_1$ may be incremented by $3\Delta DP$ for three consecutive intervals T beginning at time $t_1$ as illustrated in FIG. 6. If the motor has gained a sufficient speed with the initial ratio equal to $DP_1+3\Delta DP$, a needle position interrupt routine 50 (FIG. 3B) will be initiated at time $t_2$ to derive the pulley diameter ratio DP2 at time $t_3$.

Figure 7:
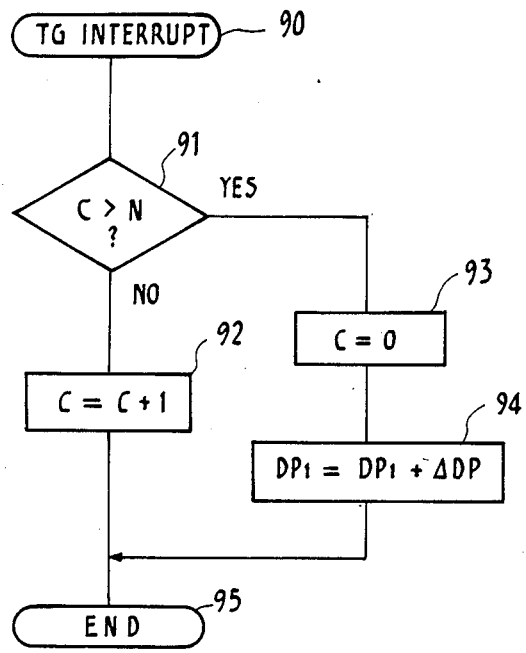
FIG. 7 is a flowchart describing an alternative program for deriving an incremental initial ratio.
Figure 8:
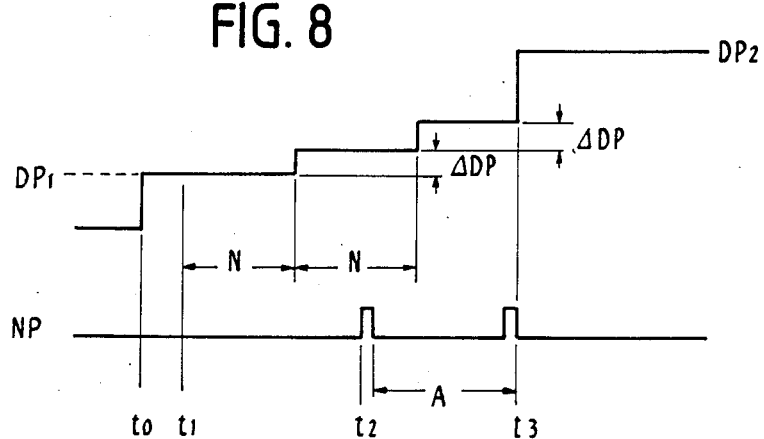
FIG. 8 is a timing diagram associated with FIG. 7.

FIG. 7 is an illustration of an alternative flowchart for deriving the initial ratio with periodic increments. A tachogenerator interrupt routine 90 occurs when the motor attains a speed of very low value and calls for decision block 91 to test to see if the count value C of a counter in the microprocessor has exceeded a predetermined value N. If the answer is negative, control exits to operations block 92 to increment the count value C by one, terminating the routine at block 95. If the answer is affirmative, the exit is to operations block 93 which directs the resetting of the count value C to zero. Exit then is to operations block 94 which directs the addition of an incremental value $\Delta DP$ to the initial ratio $DP_1$ which was derived at time $t_0$ by power-on routine 40 (FIG. 8). Block 92 is thus repeated until the count C reaches N. Thus, the initial value $DP_1$ may be incremented by $2\Delta DP$ for two successive intervals N beginning at time $t_1$ (at which the tachogenerator interrupt routine 90 is initiated) as shown in FIG. 8 and a first needle position pulse NP may occur at time $t_2$ and the armshaft pulley diameter count "A" is derived at time $t_3$ at which the needle position interrupt routine 80 is initiated to derive a pulley diameter ratio $DP_2$.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A sewing machine having a manually operated pedal, a motor having a motor pulley and an armshaft having an armshaft pulley coupled to said motor pulley by a belt, comprising:
    means for establishing a reference speed value in accordance with the amount of depression of said pedal;
    means for multiplying said reference speed value by a multiplying factor;
    a tachogenerator for generating speed related pulses at a rate proportional to the speed of rotation of said motor pulley;
    an angular position detector for generating position pulses in response to a predetermined position of said armshaft pulley;
    ratio detector means for providing a count of said speed-related pulses present during the interval between successive ones of said position pulses as a representation of a dimension of said armshaft pulley and deriving a ratio value between said count and a value representative of a dimension of said motor pulley and applying said ratio value to said multiplying means as said multiplying factor; and
    speed control means responsive to said speed-related pulses for deriving an actual speed value representative of the actual speed of said motor and responsive to the multiplied reference speed value for controlling the speed of said motor in accordance with a difference between said actual speed value and said multiplied reference speed value.

2. A sewing machine as claimed in claim 1, wherein said ratio detector means comprises means for generating an initial ratio value prior to the application of the first mentioned ratio value and applying said initial ratio value to said multiplying means as said multiplying factor.

3. A sewing machine as claimed in claim 2, wherein said initial ratio value is incremented by a predetermined amount at intervals.

4. A sewing machine as claimed in claim 3, wherein said intervals correspond to a predetermined count value of said speed-related pulses.

5. A sewing machine as claimed in claim 3, wherein said ratio detector disables said count when it is outside of the limits of an allowable range and provides a second count of said speed-related pulses to generate said ratio value.

* * * * *